US012682687B2

(12) United States Patent
Katsuya et al.

(10) Patent No.: US 12,682,687 B2
(45) Date of Patent: Jul. 14, 2026

(54) CONTROL APPARATUS FOR OUTPUTTING REGISTRATION INFORMATION FOR OBJECT AUTHENTICATION TO AN EXTERNAL DEVICE, IMAGE PICKUP APPARATUS, AND CONTROL METHOD

(71) Applicant: CANON KABUSHIKI KAISHA, Tokyo (JP)

(72) Inventors: Shohei Katsuya, Kanagawa (JP); Akira Kubota, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 18/409,096

(22) Filed: Jan. 10, 2024

(65) Prior Publication Data
US 2024/0242543 A1 Jul. 18, 2024

(30) Foreign Application Priority Data
Jan. 13, 2023 (JP) ................................ 2023-003657

(51) Int. Cl.
*G06V 40/50* (2022.01)
*G06V 10/74* (2022.01)
*G06V 40/16* (2022.01)
*H04N 23/611* (2023.01)

(52) U.S. Cl.
CPC ............ *G06V 40/50* (2022.01); *G06V 10/761* (2022.01); *G06V 40/171* (2022.01); *G06V 40/172* (2022.01); *H04N 23/611* (2023.01)

(58) Field of Classification Search
CPC .... G06V 40/50; G06V 10/761; G06V 40/171;
G06V 40/172; G06V 40/166; G06V 10/12; G06V 40/168; H04N 23/611; H04N 23/61; H04N 23/675; H04N 23/67; H04N 23/70
See application file for complete search history.

(56) References Cited

U.S. PATENT DOCUMENTS

| 9,152,886 | B2 * | 10/2015 | Sakai ................... | G06V 40/103 |
| 2014/0337993 | A1 * | 11/2014 | Winters ............. | H04N 1/00244 |
| | | | | 726/26 |
| 2015/0029347 | A1 * | 1/2015 | Tsubusaki .............. | H04N 23/64 |
| | | | | 348/208.1 |
| 2020/0280681 | A1 * | 9/2020 | Tsubusaki .............. | H04N 23/69 |
| 2022/0132023 | A1 * | 4/2022 | Kagaya ................ | H04N 23/661 |

FOREIGN PATENT DOCUMENTS

JP 2008187591 A 8/2008

* cited by examiner

*Primary Examiner* — Gevell V Selby
(74) *Attorney, Agent, or Firm* — Canon U.S.A., Inc. IP Division

(57) ABSTRACT

A control apparatus stores first feature information about a feature of a first object acquired from a first object area image of a first captured image and the first object area image as registration information for object authentication, detects an object from a captured image, acquires feature information about a feature of the object from an object area image that includes the object in the captured image, and outputs the first object area image without the first feature information from the registration information to an external apparatus.

12 Claims, 7 Drawing Sheets

1

CONTROL APPARATUS FOR OUTPUTTING REGISTRATION INFORMATION FOR OBJECT AUTHENTICATION TO AN EXTERNAL DEVICE, IMAGE PICKUP APPARATUS, AND CONTROL METHOD

BACKGROUND

Technical Field

One of the aspects of the embodiments relates to an image pickup apparatus having an object authenticating function.

Description of Related Art

Some image pickup apparatuses such as digital cameras have a tracking autofocus (AF) function that detects an object (such as a person's face or eyes) from an image generated by imaging and continues AF to track the object. Japanese Patent Laid-Open No. 2008-187591 discloses an image pickup apparatus that automatically selects a registered person using face recognition after persons to be tracked are previously registered. The face recognition determines whether the person has been registered by storing feature information extracted from a face image for registration, in a nonvolatile memory, and by acquiring the similarity between feature information extracted for a face detected from the image generated during imaging and the feature information stored in the nonvolatile memory.

The feature information of the persons registered in the image pickup apparatus having the face recognition function is demanded to be copied to another image pickup apparatus so as to perform similar face recognition there. However, in a case where an algorithm for extracting the feature information or performing the face recognition using the feature information in a certain image pickup apparatus is unique to that image pickup apparatus, the other image pickup apparatus may not be able to perform the face recognition using the feature information acquired by that image pickup apparatus.

SUMMARY

A control apparatus according to one aspect of the embodiment includes a memory storing instructions, and first feature information about a feature of a first object acquired from a first object area image of a first captured image and the first object area image as registration information for object authentication, and a processor configured to execute the instructions to detect an object from a captured image, acquire feature information about a feature of the object from an object area image that includes the object in the captured image, and output the first object area image without the first feature information from the registration information to an external apparatus (such as an external storage device and another image pickup apparatus).

A control apparatus according to another aspect of the embodiment includes a memory storing instructions, and a processor configured to execute the instructions to acquire third feature information about a feature of a first object from a first object area image output from an apparatus configured to store, as registration information for object authentication, first feature information about the feature of the first object acquired from the first object area image from a first captured image and the first object area image and to output the first object area image without the first feature information from the registration information to an external device. The memory stores registration information for object authentication including the third feature information.

An image pickup apparatus having each control apparatus also constitutes another aspect of the embodiment. A control method corresponding to each control apparatus also constitutes another aspect of the embodiment.

Further features of the disclosure will become apparent from the following description of embodiments with reference to the attached drawings.

DESCRIPTION OF THE EMBODIMENTS

Figure 1:
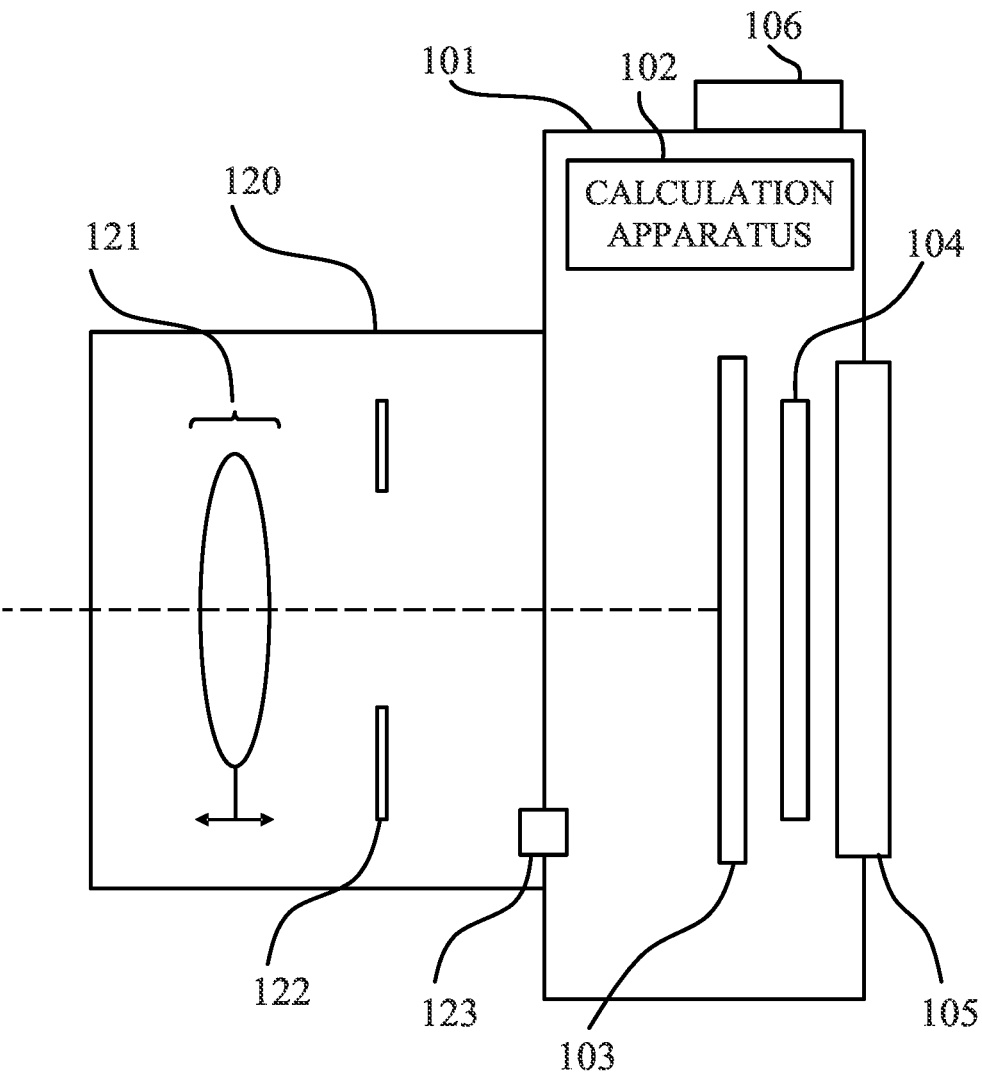
FIG. 1 illustrates the configuration of an image pickup apparatus according to a first embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a description will be given of embodiments according to the disclosure. The following embodiments do not limit the disclosure directed to the claims. Although a plurality of characteristics are described in the embodiment, not all of these characteristics are essential to the disclosure, and the plurality of characteristics may be arbitrarily combined. In the accompanying drawings, corresponding elements in respective figures will be designated by the same reference numerals, and a duplicate description thereof will be omitted.

First Embodiment

FIG. 1 illustrates the configuration of an image pickup apparatus (referred to as a camera body 101 hereinafter) according to one embodiment. An interchangeable lens unit 120 is attached to and detachable from the camera body 101. The lens unit 120 includes an imaging optical system including a focus lens 121, an aperture stop 122, and the like, and is electrically connected to the camera body 101 via a mount contact portion 123. The camera body 101 causes the lens unit 120 to control the focus lens 121 and the aperture stop 122 through communication via the mount contact portion 123 to perform focusing and light amount adjustment.

An image sensor 104 provided in the camera body 101 is a photoelectric conversion element such as a CCD sensor or a CMOS sensor. The image sensor 104 has an infrared cut filter, a low-pass filter, etc. (not illustrated). The image sensor 104 photoelectrically converts (images) an object image as an optical image formed by the imaging optical system, and outputs an imaging signal to the calculation apparatus 102 as an image processing apparatus (control apparatus). The calculation apparatus 102 generates a live-view (LV) image as image data for object observation or image data for recording from the imaging signal. The generated live-view image is displayed on a display unit 105 such as an LCD. The image data for recording is recorded in an external storage device 107, which will be described below. A shutter 103 controls an exposure amount to the image sensor 104 by opening and closing according to the operation of an imaging switch in an operation unit 106.

Figure 2:
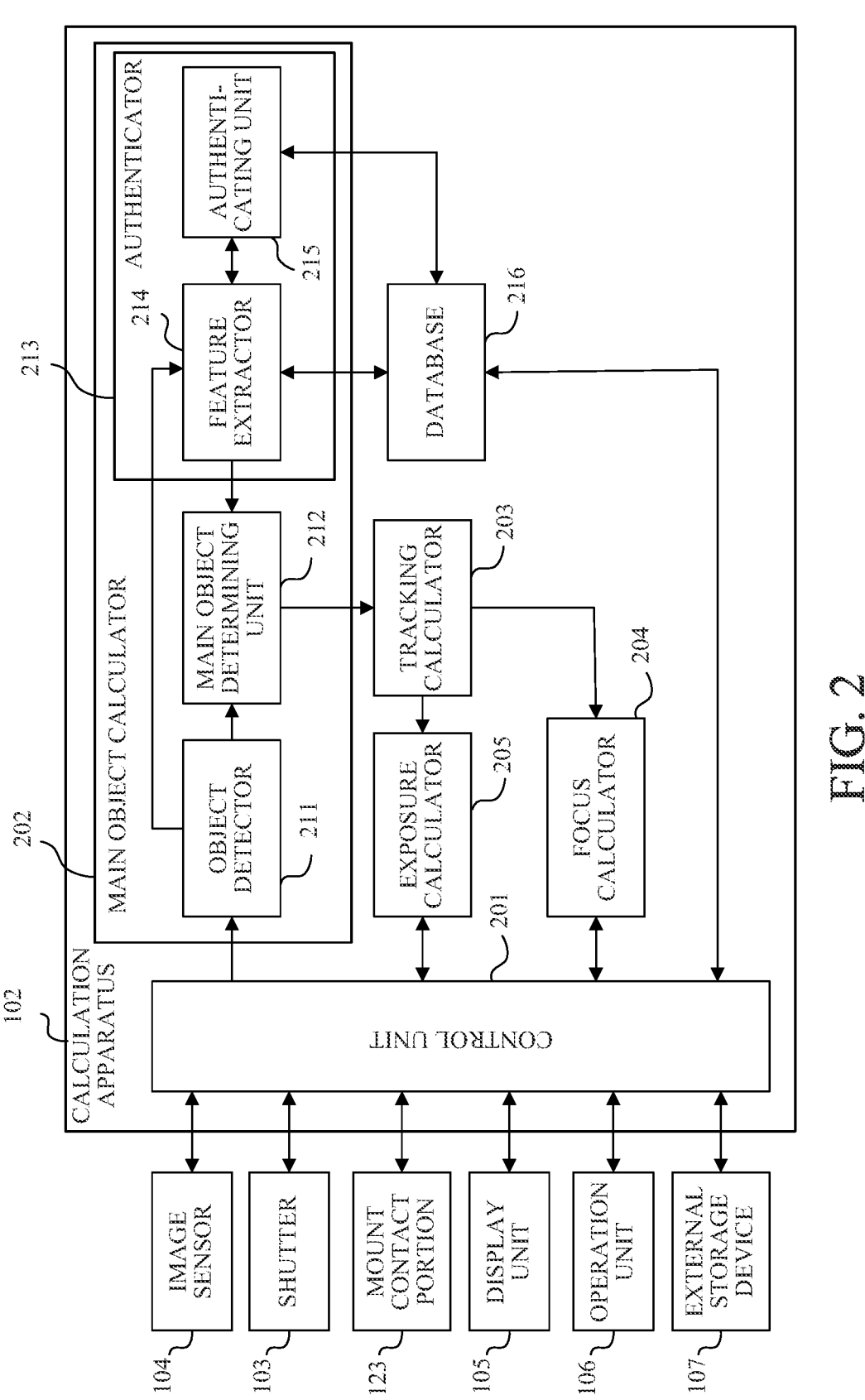
FIG. 2 is a block diagram illustrating the electric configuration of the image pickup apparatus according to the first embodiment.

FIG. 2 illustrates the electrical configuration inside the camera body 101. In FIG. 2, the same components as those in FIG. 1 are designated by the same reference numerals as those in FIG. 1.

The calculation apparatus 102 includes a computer including a CPU, a GPU, etc., and has a control unit 201, a main object calculator 202, a tracking calculator 203, a focus calculator 204, an exposure calculator 205, and a database 216. The control unit 201 controls the entire operations of the camera body 101 and the lens unit 120.

The main object calculator 202 includes an object detector 211 as a first detector, a main object determining unit 212, and an authenticator 213. The authenticator 213 includes a feature extractor 214 as a first feature acquiring unit and an authenticating unit 215 as a first authenticating unit.

The object detector 211 performs detecting processing of one or more object areas including an object within an LV image. This embodiment detects an object area including a person's face as an object. An arbitrary known method such as AdaBoost or convolutional neural network can be used to detect the object area. The detecting processing using these methods may be executed according to a program running on the CPU, may be executed by dedicated hardware, or may be executed by a combination of these methods.

The object detection result obtained from the object detector 211 is sent to the main object determining unit 212 and the feature extractor 214. The feature extractor 214 extracts feature information about the feature of the object from the detected object area and outputs it to the authenticating unit 215. The authenticating unit 215 calculates the similarity between the feature information input from the feature extractor 214 and the feature information of the registered object previously registered in database 216 serving as a first memory. Then, based on an authentication evaluation value indicating the similarity, it is determined whether the detected object to be authenticated is a registered object. More specifically, in a case where the authentication evaluation value is equal to or larger than a predetermined threshold, it is determined (authenticated) that the detected object is the registered object.

The main object determining unit 212 determines a main object based on the authentication result and the object detection result.

In a case where the authenticating unit 215 cannot authenticate the detected object as the registered object based on the authentication evaluation value, it notifies the main object determining unit 212 of this fact. In this case, the main object determining unit 212 does not determine the main object.

The tracking calculator 203 calculates the AF area and AE (auto-exposure) area on the LV image (that is, the image sensor 104) so as to track (follow) the main object determined by the main object determining unit 212. The focus calculator 204 acquires focus information (contrast evaluation value of the LV image and defocus amount of the imaging optical system) in the AF area. The control unit 201 transmits a focus instruction to the lens unit 120 to control the focus lens 121 based on the focus information. The lens unit 120 drives the focus lens 121 according to the focus instruction. Thereby, tracking AF is performed as focus control for the main object. The exposure calculator 205 acquires luminance information in the AE area. The control unit 201 transmits an aperture instruction to the lens unit 120 for controlling the aperture stop 122 based on the luminance information. The lens unit 120 drives the aperture stop 122 according to the aperture instruction. Thereby, the tracking AE is performed as exposure control for the main object.

The external storage device (storage medium) 107 includes a recording medium such as a semiconductor memory or an optical disc that is attachable to and detachable from the camera body 101 (removably connectable to the control apparatus (calculation apparatus 102 or control unit 201)), and stores image data for recording and face images as authentication image data to be described below.

Figure 3:
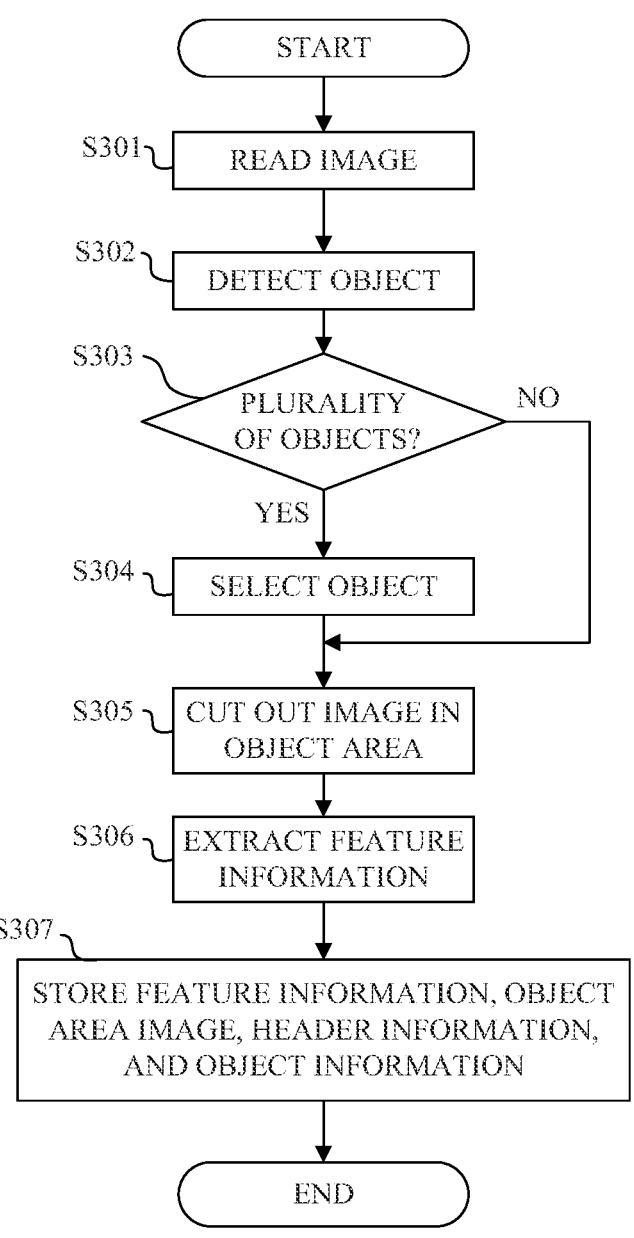
FIG. 3 is a flowchart illustrating object registration processing according to the first embodiment.

A flowchart in FIG. 3 illustrates object registering processing in the database 216 among processing that the main object calculator 202 executes according to the program. A user images faces of persons to be registered using the camera body 101 and prepares captured image data for registration (referred to as registration image hereinafter).

First, in step S301, the main object calculator 202 reads the registration image (first captured image). The registration image may be one generated within the calculation apparatus 102 by just previous imaging or may be one previously stored in the external storage device 107.

Next, in step S302, the main object calculator 202 causes the object detector 211 to detect an object from the registration image. At this time, the main object calculator 202 causes the object detector 211 to detect only faces whose facial parts such as eyes, nose, and mouth can be detected and from which feature information, which will be described below, can be correctly extracted.

Next, in step S303, the main object calculator 202 determines the number of objects detected by the object detector 211. In a case where a plurality of objects are detected, the flow proceeds to step S304, and in a case where one object is detected, the flow proceeds to step S305.

In step S304, the main object calculator 202 selects an object to be registered from among the plurality of detected objects. At this time, the selecting method may be a method of displaying a plurality of detected objects on the display unit 105 and of causing the user to select the object to be registered, or a method of automatically selecting an object closest to the center of the registration image or a predetermined area. Alternatively, the selecting method may be a method of automatically selecting the largest object among a plurality of objects. Once the object is selected, the flow proceeds to step S305.

In step S305, the main object calculator 202 cuts out an image portion of the object area (referred to as an object area image hereinafter) from the registration image. The main object calculator 202 sets an image of an area having a predetermined margin for the actual area of the detected object as an object area image to be cut out so that an image includes not only the face but also the entire head.

Next, in step S306, the main object calculator 202 causes the feature extractor 214 to extract feature information from the object area image cut out in step S305. The input image to the feature extractor 214 at this time may be set to the registration image input to the object detector 211, and feature information may be extracted from the object area image included in the registration image. Feature information includes information obtained on a rule basis from the coordinates of feature points of facial parts such as eyes, noses, and mouths, and information obtained as an output of an input image input to a neural network. The feature information may be information that directly indicates the feature of the object, or may be information that can be converted into the feature.

Next, in step S307, the main object calculator 202 associates the feature information (first feature information) acquired in step S306, the object area image, the header information, and the object information, and stores them as one registration information in the database 216. The header information includes version information, checksum, image size, and size information of the feature information for identifying the authenticator 213 for the camera body 101. The version information is used to confirm compatibility between authenticators having different version information. For example, assume that authenticators with extremely different image sizes necessary to extract the feature information are not compatible.

Examples of cases where feature information can be extracted from an object area image even if the authenticator is not compatible are as follows: Camera body A has an algorithm that can register faces of masked persons, and camera body B, which is a different model from camera body A, has an algorithm that cannot register faces of masked persons. In this case, the feature information can be extracted in the camera body A from the object area image of the masked face passed from the camera body B to the camera body A. However, the camera body B cannot extract feature information from the object area image of the masked face passed from camera body A to camera body B.

The object information includes an address where the feature information of the object is stored, an address where the object area image is stored, and the like. Hereinafter, the feature information, object area image, header information, and object information will be collectively referred to as registration information.

The database 216 can store registration information for a plurality of objects. The database 216 can set an order of priority for each of the registered objects, and the object information includes information about the order of priority. The information about the order of priority may be information that directly indicates the order of priority, such as 1, 2, 3, etc., or may be information that can be converted into the order of priority.

FIGS. 4A, 4B, 4C, 4D, and 4E illustrate examples of authentication processing in a case where the LV image (second captured image) includes a plurality of objects. A flowchart in FIG. 5 illustrates the authentication processing among the processing executed by the main object calculator 202 according to the program.

Figure 4A:
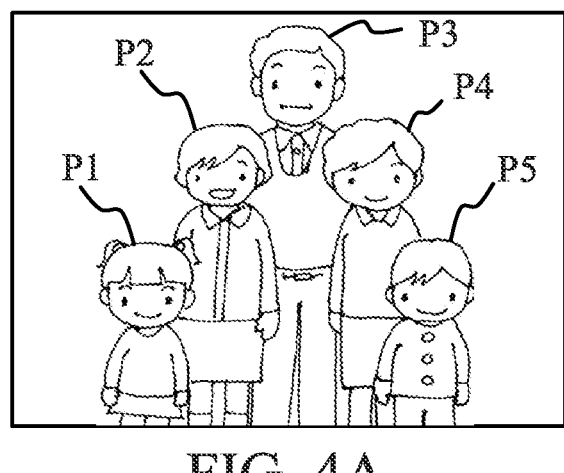
FIGS. 4A, 4B, 4C, 4D, and 4E illustrate an example of authentication processing for a plurality of objects according to the first embodiment.

FIG. 4A illustrates an imaging scene of five persons P1 to P5. It is assumed that the persons P1 and P3 are previously registered in the database 216, and the priority of the person P1 is set higher than the priority of the person P3.

The authentication processing is performed using all frame images or frame images of each predetermined frame of an LV image generated at a predetermined frame rate as an input image before an image for recording as a still or moving image is captured.

Figure 5:
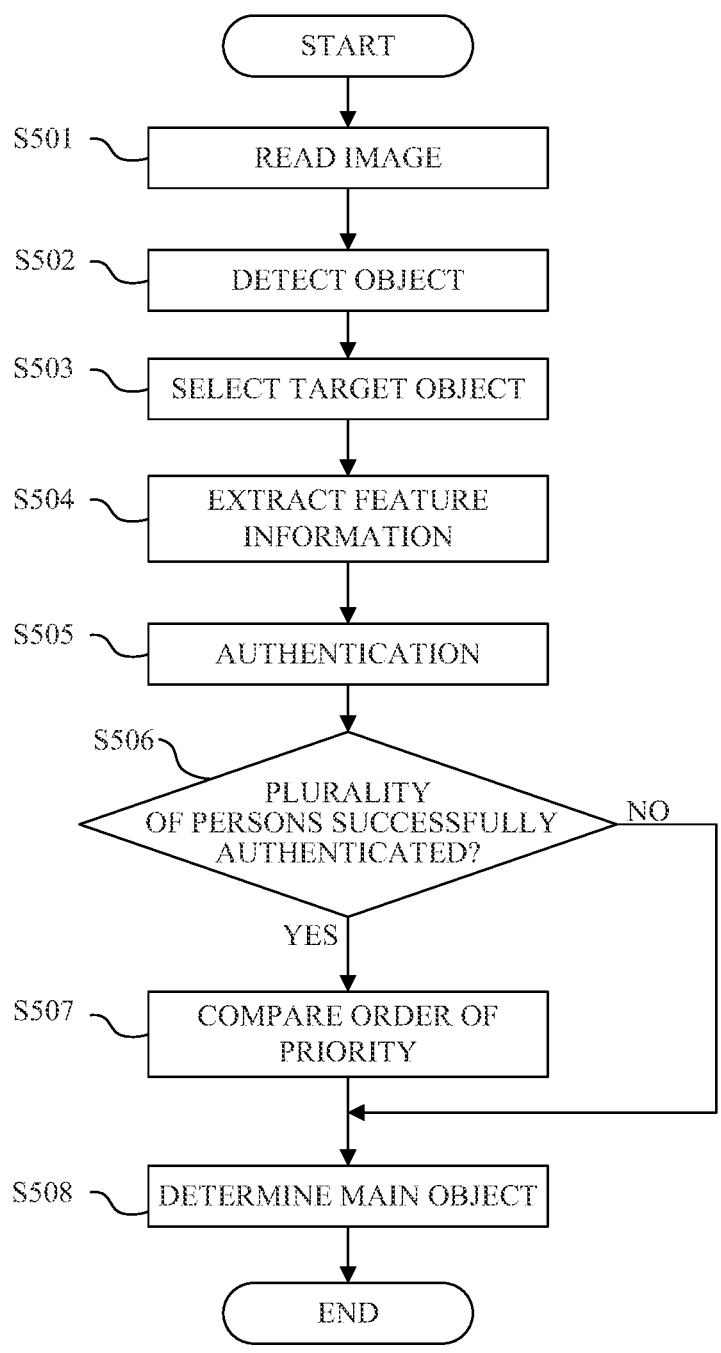
FIG. 5 is a flowchart illustrating authentication processing according to the first embodiment.

In step S501 in FIG. 5, the main object calculator 202 inputs the input image illustrated in FIG. 4A to the object detector 211.

Figure 4B:
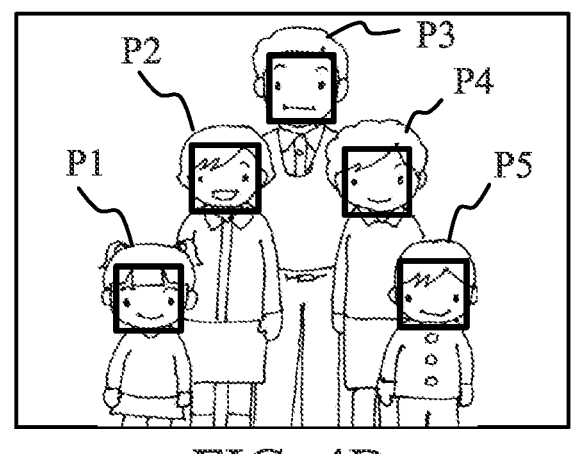

Next, in step S502, the main object calculator 202 causes the object detector 211 to detect an object within the input image. The number of objects that the object detector 211 can detect in one frame varies depending on the frame rate, the performance of the CPU or GPU, the processing amount of the object detecting algorithm, and the like. Here, it is assumed that at least five people can be detected in one frame. The object detector 211 detects the persons P1 to P5 as illustrated in FIG. 4B, and outputs the detection result to the main object determining unit 212 and the authenticator 213.

Figure 4C:
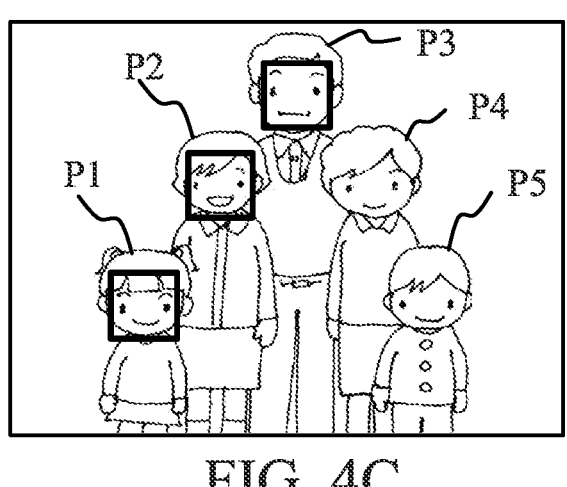

Next, in step S503, the main object calculator 202 causes the authenticator 213 to select an object to be authenticated from among the persons P1 to P5 detected in step S502. Similarly to the object detector 211, there is an upper limit to the number of objects that the authenticator 213 can authenticate in one frame. Here, it is assumed that the authenticator 213 can authenticate up to three persons in one frame. Therefore, in this step, the authenticating unit 215 selects three persons from among the persons P1 to P5. In one selecting method, for example, three persons on the left side in the detection result are authenticated in one frame, and the fourth and subsequent objects from the left are authenticated in the next frame, so that the objects to be authenticated change for each frame. The selection may depend on the authentication priority of each object, such as lowering the authentication cycle for an object that has already been authenticated and registered. Here, as illustrated in FIG. 4C, it is assumed that the persons P1 to P3 are selected as objects to be authenticated.

Next, in step S505, the main object calculator 202 causes the authenticator 213 to authenticate each of the selected detected objects. In the authenticator 213, the feature extractor 214 first extracts feature information (second feature information) of the selected detected object from the image portion of the selected detected object in the input image. As mentioned above, algorithms that are used to extract feature information include an algorithm that acquires feature information obtained on a rule basis from the coordinates of feature points of facial parts such as eyes, noses, and mouths, and an algorithm that uses an input image for an input to a neural network and acquires feature information as an output. The feature extractor 214 inputs the extracted feature information to the authenticating unit 215.

Figure 4D:
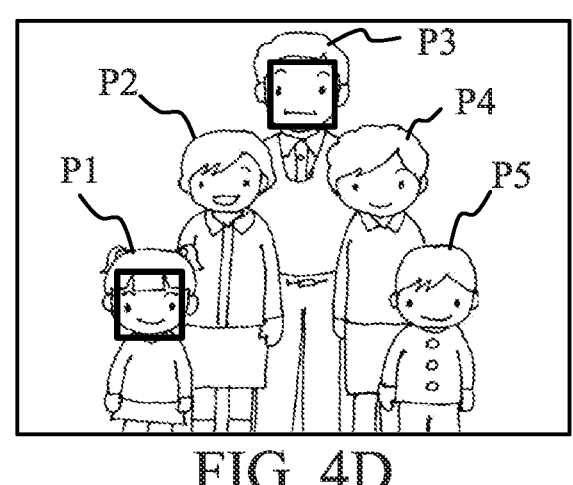

The authenticating unit 215 reads the feature information (first feature information) of the registered object stored in the database 216. Then, the authenticating unit 215 calculates the similarity between the read feature information of the registered object and the feature information (second feature information) of the detected object inputted from the feature extractor 214 and generates an authentication evaluation value representing the similarity. The authenticating unit 215 determines that authentication is successful (the detected object is the registered object) in a case where the authentication evaluation value is equal to or larger than a predetermined threshold, determines that authentication has failed in a case where the authentication evaluation value is smaller than the predetermined threshold, and notifies the main object determining unit 212 of the determination result. Here, as illustrated in FIG. 4D, it is assumed that the authentication of the persons P1 and P3 is successful.

After the next step S506, the main object calculator 202 causes the main object determining unit 212 to determine the main object. First, in step S506, the main object determining unit 212 determines whether the number of objects successfully authenticated by the authenticator 213 is plural. In a case where only one object has been successfully authenticated, that object is regarded as a main object candidate and the flow proceeds to step S508. In a case where a plurality of objects have been successfully authenticated, the flow proceeds to step S507.

Figure 4E:
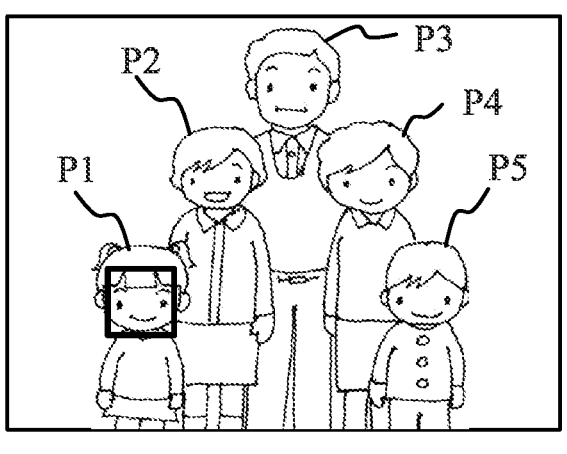

In step S507, the main object determining unit 212 selects the object with the highest order of priority among the plurality of objects that have been successfully authenticated and sets it as the main object candidate. As described above, here, the priority of the person P1 is higher than the priority of the person P3, so the person P1 is selected as the main object candidate, as illustrated in FIG. 4E. Then, the flow proceeds to step S508.

In step S508, the main object determining unit 212 determines the final main object based on the information on the main object candidate and the detection result from the object detector 211.

The above authentication processing preferentially and automatically selects a previously registered person as the main object and proper tracking AF and tracking AE are executed for the main object.

Figure 6A:
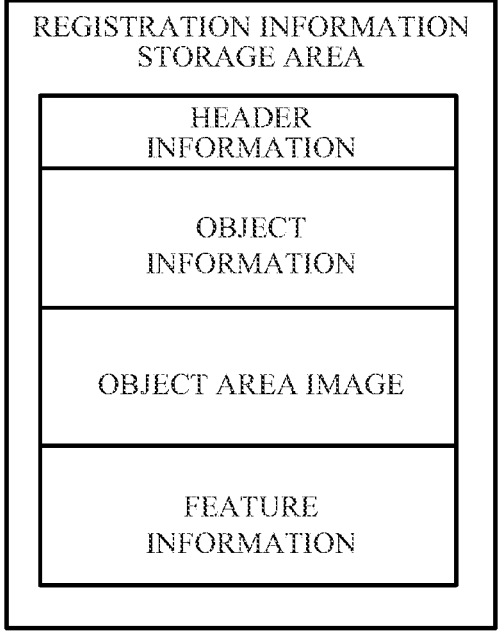
FIGS. 6A and 6B illustrate a memory map of stored registration data and binary data output to the outside in the first embodiment.
Figure 6B:
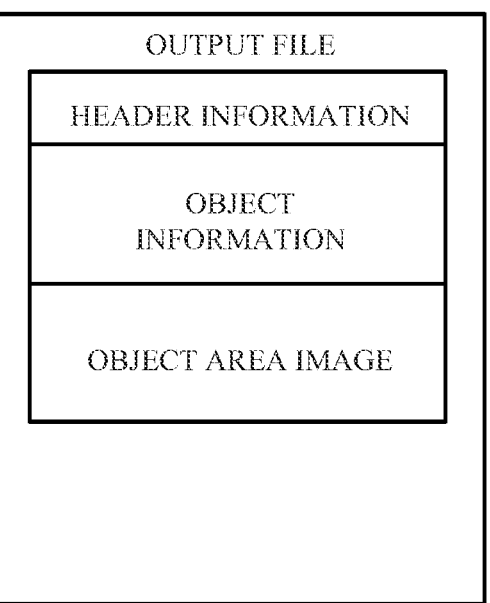

FIG. 6A illustrates a memory map in the registration information storage area in the database 216, and FIG. 6B illustrates a memory map of binary data output from the database 216 to the external storage device 107 via the control unit 201. In a case where the user performs a predetermined information output operation on the operation unit 106, the control unit 201 serving as an output unit outputs the registration information of the registered object stored in the database 216 to the external storage device 107. In the registration information storage area of the database 216, as illustrated in FIG. 6A, mutually associated header information, object information, object area images, and feature information are stored in different addresses. At this time, the feature information is placed at the end of the registration information. In a case where the database 216 stores registration information for a plurality of registered objects, header information, object information, object area images, and feature information are stored in the registration information storage area for each registered object.

Figure 7:
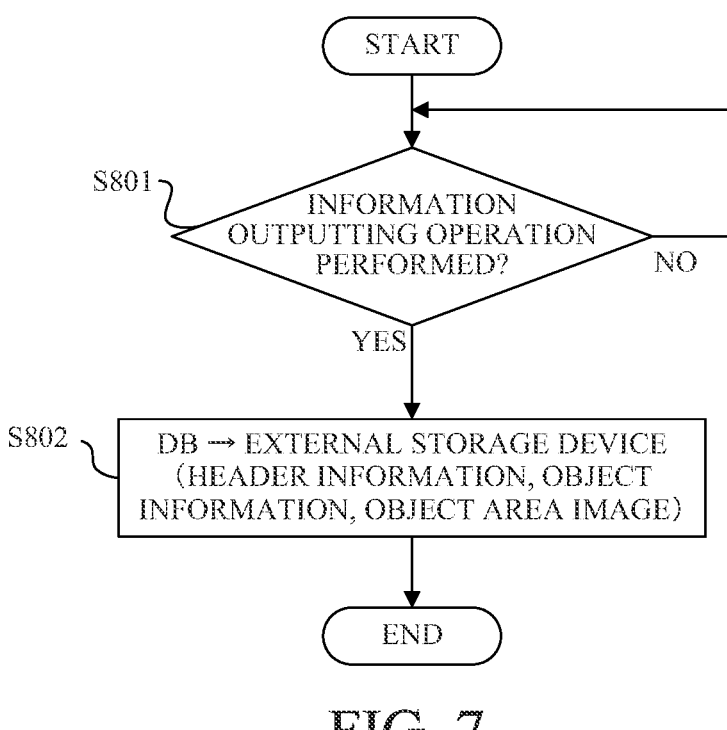
FIG. 7 is a flowchart illustrating processing of writing registration information from a database to an external storage device according to the embodiment, which is executed in the first embodiment.

A flowchart in FIG. 7 illustrates processing in which the control unit 201 serving as the output unit writes registration information stored (registered) in the database 216 to the external storage device 107 according to a program.

In step S801, the control unit 201 determines whether the user has performed an information output operation on the operation unit 106 to output the registration information. In a case where the information output operation has been performed, the flow proceeds to step S802, and in a case where the information output operation has not been performed, this determination is repeated.

In step S802, the control unit 201 outputs as a single binary file the header information, object information, and object area image, excluding the feature information among the registration information in the database (DB) 216, to the external storage device 107. That is, the control unit 201 outputs the object area image to the external storage device 107 without the feature information. Header information, object information, and object area images are stored in the output file in the arrangement illustrated in FIG. 6B. In a case where the database 216 stores registration information of a plurality of registered objects, the header information, object information, and object area images of all the registered objects are collectively output as a single binary file. The user can give an arbitrary name to the binary file. Thereby, the user can name and manage registration information by organization or group. In a case where the object information includes the order of priority information for a plurality of registered objects, the order of priority information is also output.

In a case where writing of the registration information from the database 216 to the external storage device 107 is completed in this way, this flow ends.

The external storage device 107 is attached to another image pickup apparatus (not illustrated) separate from the camera body 101, and the header information, object information, and object area image stored in the external storage device 107 stored in the separate image pickup apparatus is read out. The other image pickup apparatus extracts feature information of the object from the read object area image and stores the header information, object information, and the object area image and registration information including feature information in a database.

Second Embodiment

A description will now be given of a second embodiment. The camera body (second image pickup apparatus) according to this embodiment has the same configuration as the camera body (first image pickup apparatus) 101 of the first embodiment illustrated in FIGS. 1 and 2, and those elements in the camera body according to this embodiment will be designated by the same reference numerals that are used in the first embodiment, with a single quotation mark "'". The camera body according to this embodiment is a camera body in which the authenticator 213' is not compatible with the authenticator 213 in the first embodiment (because its algorithm regarding the face authentication is different).

Figure 8:
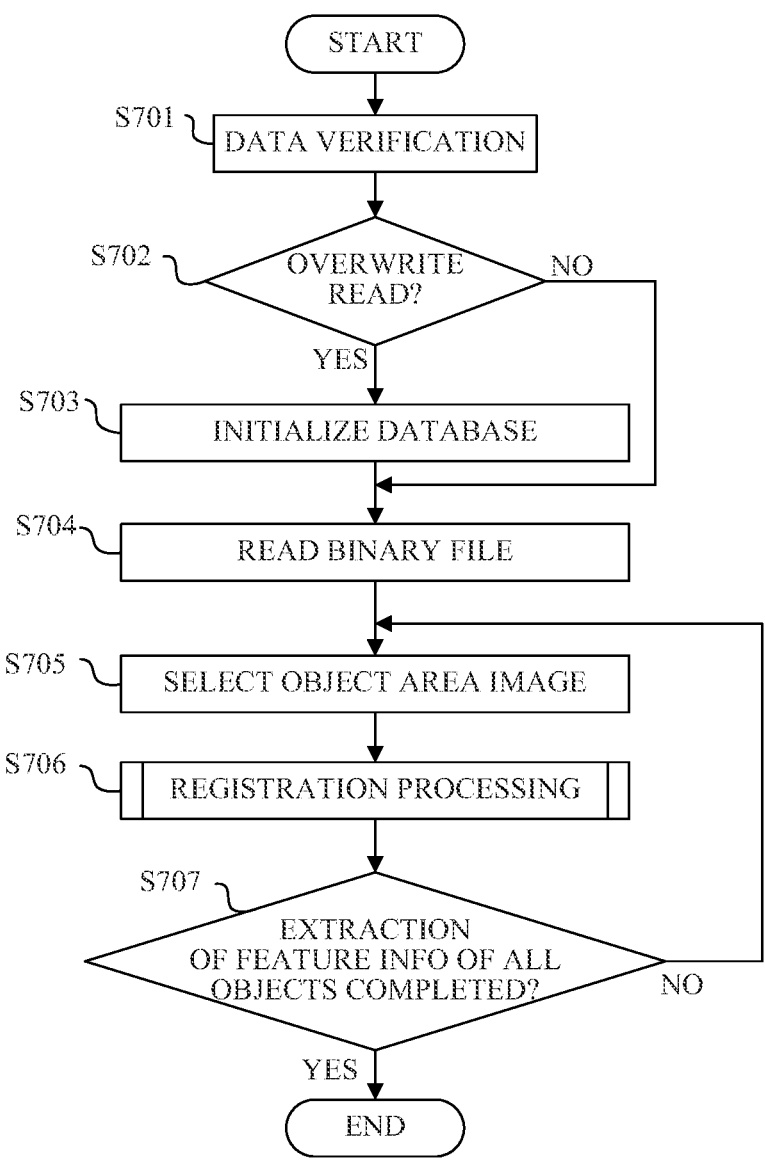
FIG. 8 is a flowchart illustrating object registration processing according to a second embodiment.

A flowchart in FIG. 8 illustrates object registration processing executed by a control unit 201' and a main object calculator 202' according to the program in this embodiment. The object registration processing according to this embodiment may be executed in the camera body 101 according to the first embodiment.

First, in step S701, the control unit 201' of the camera body according to this embodiment, to which the external storage device 107 detached from the camera body 101 according to the first embodiment is attached, refers to the header information stored in the external storage device 107 and validates the registration information in the binary file. In this verification, the control unit 201' confirms whether the registration information has been damaged or tampered with using the checksum, and whether it is compatible with the authenticator 213' based on the version information of the authenticator 213 that generated the registration information. In a case where the verification is successful, the flow proceeds to step S702; in a case where the verification is unsuccessful, the reading ends without performing the subsequent processing.

In step S702, the control unit 201' serving as a storage processing unit determines which of the overwrite read mode (overwrite processing) and the additional read mode (additional storage processing) has been selected by the user as the registration information read mode. In the overwrite read mode, the object area image previously stored in the database 216' serving as a second storage unit is deleted, and then an object area image (first object area image) read out of the external storage device 107 is stored in the database 216'. In the additional read mode, the object area image read out of the external storage device 107 is stored while the object area image previously stored in the database 216' is maintained. In a case where the additional read mode is selected, the flow proceeds to step S704, and in a case where the overwrite read mode is selected, the flow proceeds to step S703.

In step S703, the control unit 201' initializes the database 216 by deleting the existing registration information previously stored in the database 216'. Thereafter, the flow proceeds to step S704.

Next, in step S704, the control unit 201' reads the object information and object area image in the binary file and stores them in the corresponding registration information storage area in the database 216'. At this time, in the additional read mode, the order of priority included in the object information of the existing registered object is emphasized, so the order of priority is updated according to a predetermined rule.

Next, in step S705, in a case where a plurality of object area images are read in step S704, the control unit 201' selects one of them.

Next, in step S706, the main object calculator 202' performs registration processing. More specifically, the main object calculator 202' causes a feature extractor 214' serving as a second feature acquiring unit in the authenticator 213' to extract feature information (third feature information) of the object (first object) similarly to step S306 of FIG. 3 from the object area image stored in the database 216' in step S704. The main object calculator 202' associates the extracted feature information, object area image, header information, and object information with each other and stores them as one registration information in the database 216', similarly to step S307 in FIG. 3.

Next, in step S707, the main object calculator 202' determines whether extraction of the feature information in step S706 and storage in the database 216' have been completed for all object area images read into the database 216'. The processing from step S705 to step S706 is repeated until the extraction and storage of the feature information of all the object area images are completed, and in a case where the extraction and storage of the feature information of all the object area images are completed, this flow ends.

Thereafter, the main object calculator 202' causes the object detector 211' as a second detector to detect an object (third object) from an LV image (third captured image), similarly to step S502 in FIG. 5. Then, the main object calculator 202' causes the feature extractor 214' serving as a third feature acquiring unit to extract feature information of the detected object (fourth feature information) from the object area image (third object area image) of the LV image, similarly to step S504 in FIG. 5. Moreover, the main object calculator 202' causes the authenticating unit 215' serving as a second authenticator to perform authentication processing for determining whether the detected object is a registered object (first object) based on the similarly between the feature information of the detected object and the feature information of the registered object (authentication evaluation value) in the database 216', similarly to step S505 in FIG. 5.

Similarly to the first embodiment, the tracking calculator 203' calculates the AF area and the AE area to track the main object determined by the main object determining unit 212' (detected object authenticated as the registered object). The control unit 201' performs tracking AF based on focus information in the AF area acquired by the focus calculator 204', and performs tracking AE based on the luminance information in the AE area acquired by the exposure calculator 205. In a case where a plurality of detected objects are detected and information about the order of priority of the plurality of registered objects is stored in the external storage device 107, the tracking AF and tracking AE are preferentially performed for the detected object that has been authenticated as the registered object with a higher priority.

As described above, in a case where the image pickup apparatus outputs the registration information stored in the database to the external storage device, the first embodiment outputs the object area image without outputting the feature information. The second embodiment stores an object area image of the registration information stored in the external storage device in the first embodiment, in a database of another image pickup apparatus, extracts feature information from the object area image, and uses it for object authentication. Thereby, among image pickup apparatuses that have different algorithms for object authentication, one image pickup apparatus can perform object authentication using the object area image registered in another image pickup apparatus.

In each of the above embodiments, object area images are communicated between image pickup apparatuses whose authenticators are not compatible via an external storage device, but object area images may also be communicated via wired or wireless communication.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Between image pickup apparatuses that perform object authentication using different algorithms, this embodiment can perform object authentication in one image pickup apparatus using a first object area image registered in another image pickup apparatus.

This application claims the benefit of Japanese Patent Application No. 2023-003657, filed on Jan. 13, 2023, which is hereby incorporated by reference herein in its entirety.

What is claimed is:

1. A control apparatus comprising:
a memory storing instructions, and first feature information about a feature of a first object acquired from a first object area image of a first captured image and the first object area image as registration information for object authentication; and
a processor configured to execute the instructions to:
detect an object from a captured image,
acquire feature information about a feature of the object from an object area image that includes the object in the captured image, and
output the first object area image without the first feature information from the registration information to an external device,
wherein the processor is configured to authenticate that a second object is the first object using the first feature information and second feature information about a feature of the second object acquired from a second object area image in a second captured image.

2. The control apparatus according to claim 1, wherein the processor is configured to perform at least one of focus control and exposure control for the second object that has been authenticated as the first object.

3. The control apparatus according to claim 1, wherein in a case where the memory stores the registration information for each of a plurality of first objects, the processor is configured to output a single file to the external device by including the first object area image of each of the plurality of first objects in the single file.

4. A control apparatus comprising:
a memory storing instructions, and first feature information about a feature of a first object acquired from a first object area image of a first captured image and the first object area image as registration information for object authentication; and a processor configured to execute the instructions to:
detect an object from a captured image,
acquire feature information about a feature of the object from an object area image that includes the object in the captured image, and
output the first object area image without the first feature information from the registration information to an external device,
wherein in a case where the memory stores the registration information for each of a plurality of first objects and the registration information includes information about an order of priority among the plurality of first objects, the processor is configured to output information about the first object area image of each of the plurality of first object and the order of priority to the external device.

5. The control apparatus according to claim 4, wherein in a case where a plurality of second objects are detected from the second captured image, the processor is configured to preferentially perform at least one of focus control and exposure control for one of the plurality of second objects that has been authenticated as the first object and has a higher order of priority.

6. An image pickup apparatus comprising:
the control apparatus of claim 1; and
an image sensor.

7. A control method comprising the steps of:
detecting an object from a captured image;
acquiring feature information about a feature of the object from an object area image that includes the object in the captured image;
storing first feature information about a feature of a first object acquired from a first object area image of a first captured image and the first object area image as registration information for object authentication;
authenticating that a second object is the first object using the first feature information and second feature information about a feature of the second object acquired from a second object area image in a second captured image; and
outputting the first object area image without the first feature information from the registration information to an external apparatus.

8. A non-transitory computer-readable storage medium storing a program that causes a computer to execute the control method according to claim 7.

9. The control apparatus according to claim 4, wherein the processor is configured to authenticate that a second object is the first object using the first feature information and second feature information about a feature of the second object acquired from a second object area image in a second captured image.

10. The control apparatus according to claim 9, wherein the processor is configured to perform at least one of focus control and exposure control for the second object that has been authenticated as the first object.

11. A control method comprising the steps of:
detecting an object from a captured image;
acquiring feature information about a feature of the object from an object area image that includes the object in the captured image;
storing first feature information about a feature of a first object acquired from a first object area image of a first captured image and the first object area image as registration information for object authentication, the registration information further including information
indicating an order of priority among the plurality of
first objects; and outputting the first object area image without the first
feature information from the registration information to
an external apparatus.

12. A non-transitory computer-readable storage medium
storing a program that causes a computer to execute the
control method according to claim 11.

* * * * *